(12) United States Patent
Knowles et al.

(10) Patent No.: US 12,273,268 B2
(45) Date of Patent: Apr. 8, 2025

(54) COMPUTER SYSTEM HAVING A CHIP CONFIGURED FOR MEMORY ATTACHMENT AND ROUTING

(71) Applicant: Graphcore Limited, Bristol (GB)

(72) Inventors: Simon Christian Knowles, Bristol (GB); Stephen Felix, Bristol (GB); Daniel John Pelham Wilkinson, Bristol (GB)

(73) Assignee: GRAPHCORE LIMITED, Bristol (GB)

( * ) Notice: Subject to any disclaimer, the term of this patent is extended or adjusted under 35 U.S.C. 154(b) by 115 days.

(21) Appl. No.: 18/159,387

(22) Filed: Jan. 25, 2023

(65) Prior Publication Data

US 2023/0283547 A1 Sep. 7, 2023

(30) Foreign Application Priority Data

Mar. 1, 2022 (GB) ..................................... 2202807

(51) Int. Cl.
*H04L 45/60* (2022.01)
*G06F 13/16* (2006.01)
(Continued)

(52) U.S. Cl.
CPC .......... *H04L 45/60* (2013.01); *G06F 13/1668* (2013.01); *G06F 15/163* (2013.01); *G06F 15/7825* (2013.01); *H04L 45/566* (2013.01)

(58) Field of Classification Search
CPC ... H04L 45/60; H04L 45/566; G06F 13/1668; G06F 15/163; G06F 15/7825
See application file for complete search history.

(56) References Cited

U.S. PATENT DOCUMENTS 6,055,618 A 4/2000 Thorson
8,327,187 B1 12/2012 Metcalf
(Continued)

FOREIGN PATENT DOCUMENTS

| CN | 106134137 A | * | 11/2016 | ......... G06F 9/45558 |
| JP | 5115975 B2 | * | 1/2013 | |
| TW | 200422849 A | * | 11/2004 | .......... G06F 11/3636 |

OTHER PUBLICATIONS

Translation of TW-200422849-A (Year: 2004).*
(Continued)

*Primary Examiner* — Henry Tsai
*Assistant Examiner* — John B Roche
(74) *Attorney, Agent, or Firm* — HAYNES AND BOONE, LLP

(57) ABSTRACT

A memory attachment and routing chip includes a single die having a set of external ports; at least one memory attachment interface comprising a memory controller to attach to external memory, and a fabric core in which routing logic is implemented. The routing logic can (i) receive a first packet of a first type from a first port of the set of ports, the first type of packet being a memory access packet with a memory address which lies in a range of memory addresses associated with the memory attachment and routing chip, detect the memory address and route the packet of the first type to the memory attachment interface. The routing logic can (ii) receive a second packet of a second type, the second type of packet being an inter-processor packet comprising a destination identifier identifying a processing chip external to the memory attachment.

23 Claims, 10 Drawing Sheets

(51) Int. Cl.
  *G06F 15/163* (2006.01)
  *G06F 15/78* (2006.01)
  *H04L 45/00* (2022.01)

(56) References Cited

U.S. PATENT DOCUMENTS

| | | | |
|---|---|---|---|
| 9,432,298 B1* | 8/2016 | Smith | H04L 49/9057 |
| 2006/0173983 A1 | 8/2006 | Naito et al. | |
| 2009/0307467 A1 | 12/2009 | Faraj | |
| 2013/0151713 A1 | 6/2013 | Faraj | |
| 2013/0191437 A1 | 7/2013 | Itoh | |
| 2015/0222532 A1* | 8/2015 | Ghobadi | H04L 67/1004 370/392 |
| 2016/0131743 A1 | 5/2016 | Addison et al. | |
| 2016/0162436 A1* | 6/2016 | Raghavan | G06F 13/28 710/308 |
| 2016/0352867 A1* | 12/2016 | Subbarayan | H04L 41/28 |
| 2017/0063625 A1 | 3/2017 | Philip et al. | |
| 2017/0171111 A1 | 6/2017 | Khare | |
| 2017/0220499 A1* | 8/2017 | Gray | G06F 13/36 |
| 2018/0240039 A1 | 8/2018 | McLaren | |
| 2019/0045003 A1 | 2/2019 | Archer | |
| 2019/0394654 A1* | 12/2019 | Gardner | H04W 40/22 |

OTHER PUBLICATIONS

Translation of JP-5115975-B2 (Year: 2013).*
Translation of CN-106134137-A (Year: 2016).*
International Search Report and Written Opinion dated Jun. 8, 2021 for Patent Application No. PCT/EP2021/057558. 16 pages.
Christoph Lenzen, et al., "CLEX: Yet Another Supercomputer Architecture?", Arxiv.org, Cornell University Library, Ithaca, NY. Jul. 1, 2016. XP080711482.
International Search Report and Written Opinion dated Jun. 9, 2021 for Application No. PCT/EP2021/057563. 17 pages.
Office Action dated Mar. 28, 2023 for Japanese Patent Application No. 2022-507331.
Carlo H. Sequin, "Doubly Twisted Torus Networks for VLSI Processor Arrays", ISCA '81 Proceedings of the 8th Annual Symposium on Computer Architecture, May 1981, pp. 471-480.
Search Report dated Oct. 19, 2022 for United Kingdom Patent Application No. GB2202807.0 3 pages.

* cited by examiner

COMPUTER SYSTEM HAVING A CHIP CONFIGURED FOR MEMORY ATTACHMENT AND ROUTING

CROSS-REFERENCE TO RELATED APPLICATIONS

The present application claims priority to United Kingdom Patent Application No. GB2202807.0, filed Mar. 1, 2022, the disclosure of which is hereby incorporated herein by reference in its entirety.

FIELD

The present disclosure relates to a computer system and particularly but not exclusively to a computer comprising one or more processing chips connected to computer memory.

Background

The demand for high performance computing is ever increasing. In particular, efforts are being made to meet the demands of artificial intelligence/machine learning models which impose strenuous requirements on computing resource. It is known to address certain requirements by interconnecting a plurality of processing chips in a cluster, the processing chips being configured to operate in a co-operative manner to meet the demands of processing power required to process large AI/ML models.

Another demand which is imposed on high performance compute is the ability to have access to high-capacity memory. Attempts have been made to connect external memory to processing nodes in a cluster to increase the capacity of the memory. Such external memory may be connected by memory busses which provide an access path between the external memory and the processing node. These memory busses may take the form of parallel or serial links. For example, dynamic random access memories (DRAMs) may be mounted on dual in-line memory modules (DIMMs) on server racks. These can provide the scalable memory capacity of the order of terabytes. Such DIMMs may be mounted vertically in a server rack, and many can be stacked together to provide the memory capacity required for the computer.

SUMMARY

The present inventor seeks to address the joint problems by providing a memory attachment and routing chip which enables access to high-capacity memory, but which also enables processing chips to communicate with one another to enhance the processing power for a particular task.

According to an aspect of the disclosure there is provided a memory attachment and routing chip comprising a single die having a set of external ports, at least one memory attachment interface comprising a memory controller and configured to attach to external memory, and a fabric core in which routing logic is implemented, wherein the routing logic is configured to (i) receive a first packet of a first type from a first port of the set of ports, the first type of packet being a memory access packet comprising a memory address which lies in a range of memory addresses associated with the memory attachment and routing chip, to detect the memory address and to route the packet of the first type to the memory attachment interface, and (ii) to receive a second packet of a second type, the second type of packet being an inter-processor packet comprising a destination identifier identifying a processing chip external to the memory attachment and routing chip and to route the second packet to a second one of the external ports, the second one of the external ports being selected based on the destination identifier.

The routing logic may be configured to examine an incoming packet to determine if it is a memory access packet for routing to the memory controller or an inter processor packet intended for one of the set of external ports, and to route the incoming packet based on the determination.

Each external port may be connected to a link and comprises at least one link controller formed as a circuit in the die for controlling transmission of messages on and off the memory attachment and routing chip via the link.

In certain embodiments, the link is a SERDES link and the link controller comprises a circuit configured to control transmission and reception of packets over the SERDES link. The SERDES link may comprise digital and/or analogue circuits.

A first group of the external ports may be connected to respective serial links configured for attachment to respective processor chips, wherein the routing logic is configured to detect that the packet of the second type comprises a processor identifier to identify one of the first group of external ports.

The memory attachment and routing chip may be connected in a first computer cluster wherein at least one of the external ports is attached to a cluster connecting link configured to connect to another memory attachment and routing chip in a second computer cluster.

In some embodiments, at least one of the external ports is connected to a system facing link configured to connect to a switching fabric, and wherein the routing logic is configured to detect a domain identifier in packets of the first or second type and to route the packet to the system facing link.

The set of external ports may comprise a host port connected to a link configured to connect to a host computer.

The memory attachment and routing chip may comprise multiple memory controllers, each memory controller configured to attach to a respective dynamic random access memory (DRAM) via a respective DRAM interface component formed in the die.

Each DRAM interface may be configured according to the JEDEC standard.

In certain embodiments, the die is of rectangular shape, the set of external ports being arranged along one long edge of the die.

The memory attachment interface may comprise memory attachment connections for connecting the at least one memory controller to external memory, the memory attachment connections located along the other long edge of the die.

The die may have an aspect ratio greater than 3:1.

The die may comprise multiple bumps for flip chip attachment of the die to a substrate, the bumps comprising a first group being in electrical connection with the external ports and a second group being in electrical connection with the memory attachment interface.

A third group of bumps may be provided in electrical connection with a memory controller power supply.

A fourth group of bumps may be provided in electrical connection with a chip power supply.

The routing logic may be configured to receive a third type of packet comprises a memory address in a second range of memory addresses outside the range associated with the memory attachment and routing chip, to determine a second memory attachment and routing chip associated with a second range of memory addresses and to route the packet to the other memory attachment and routing chip via one of the external ports.

The memory attachment and routing chip may not comprise a processor, or be a processor. The memory attachment and routing chip may not comprise processing logic for executing instructions.

The first packet and/or second packet may remain unaltered by the memory attachment and routing chip. In other words, the routing logic may be configured to examine the incoming packet without changing the contents of the incoming packet. The memory attachment and routing chip may be configured to route the incoming packet, without otherwise processing the incoming packet. Accordingly, the incoming packet received at the memory attachment and routing chip is output from the memory and attachment chip via the memory attachment interface or second one of the external ports in substantially the same form as when received.

The present inventor has recognised certain disadvantages associated with the current nature of cluster connectivity. Silicon chips contain circuits laid out in two dimensions on a die surface, commonly divided into a "core" (such as processor core 2) surrounded by a periphery or "beachfront" 7 (see FIG. 1). The beachfront is used for input-output (TO) circuits, which are placed at the edges of the chip to ease breakout of signals to packaging pins. For example, the beachfront 7 is used to accommodate the inter-processor links 6a, 6b illustrated in FIGS. 2 and 3, and the processor—memory links 8a . . . 8d to external memory.

The area of the beachfront depends on the types and bandwidth of IO requirements. High performance computing chips frequently use near maximum manufacturable die size ("full reticle") of approximately 25.5×32.5 mm, and require a beachfront depth of about 2 mm on each of the four edges of the die. With current lithographic technology, a full reticle die yields a die core of ~21.5×~28.5 mm, which is approximately 74% of the total die area. The computing resources of the die are constrained to this core fraction, which has led the inventor to recognise that the cost of the beachfront area is significant. FIG. 1 shows an example of a die with a processor core 2 and all-round beachfront (on all four edges) labelled 7.

According to an aspect of the disclosure there is provided a computer comprising:
  first and second computer devices of a first class, each computer device of the first class comprising first and second external ports, at least one memory controller configured to attach to external memory, and routing logic configurable to route data from the first external port to one of the at least one memory controller and the second external port;
  first and second computer devices of a second class, the first computer device of the second class being connected to the first external ports via respective first and second links and the second computer device of the second class being connected to the second external ports via respective third and fourth links, each of the first and second computer devices of the second class comprising processing circuitry configured to execute one or more computer program and connected to the first and second links, or third and fourth links, respectively to transmit and receive messages via their respective first and second links, or third and fourth links.

In some embodiments, the first computer device of the second class may be configured to transmit a message to the first external port of the first or second computer device of the first class via the first or second link, and the routing logic on the first or second computer device of the first class is configured to route the received message to the second external port of the respective first or second computer device of the first class in order to transmit the message to the second computer device of the second class.

In some embodiments, each of the first, second, third and fourth links are fixed point-to-point links without intermediate switches. In such an embodiment, the first, second, third and fourth links may be serial links.

In some embodiments, the first computer device of the second class may be configured to transmit a memory access message to the first or second computer device of the first class, and wherein the routing logic of the first or second computer device of the first class is configured to route the memory access message to its at least one memory controller for accessing the external memory.

In some embodiments, the memory access message is a memory write.

In some embodiments, the memory access message is a memory read.

In some embodiments, each computer device of the first class comprises a single chip having a fabric core in which the routing logic is implemented and a port connection region extending along one longitudinal edge of the chip in which the external ports are arranged.

In some embodiments, each computer device of the second class comprises a single chip having a processor core in which the processing circuitry is implemented and a processor port connection region arranged along at least one edge of the chip in which processor ports are arranged connected respectively to the first and second, or third and fourth, links, the chip comprising a further processor port connection region along an opposite edge of the chip, the further processor port connection region comprising further processor ports for connection to additional links connected to additional computer devices of the first class.

In some embodiments, the processor core extends substantially to the other edges of the processor chip.

In some embodiments, the other edges of the chip comprise high bandwidth memory connectors configured to connect the processor chip to at least one high bandwidth memory device.

In some embodiments, each computer device of the first class comprises one or more memory attachment interface for attaching the at least one memory controller to external memory.

In some embodiments, the computer comprises a cluster of n computer devices of the first class and N computer devices of the second class, where n is two or more, and N is greater than two and wherein each computer device of the second class is connected to the n computer devices of the first class via respective fixed links, and each computer device of the first class is connected to the N computer devices of the second class via respective fixed links.

In some embodiments, the computer comprises a cluster of n computer devices of the first class and N computer devices of the second class, where n is greater than two, and N is two or more and wherein each computer device of the second class is connected to the n computer devices of the first class via respective fixed links, and each computer device of the first class is connected to the N computer devices of the second class via respective fixed links.

In some embodiments, the computer comprises a cluster of n computer devices of the first class and N computer devices of the second class, where n is greater than 2, and N is greater than 2 and wherein each computer device of the second class is connected to the n computer devices of the first class via respective fixed links, and each computer device of the first class is connected to the N computer devices of the second class via respective fixed links.

In some embodiments of the computer, n=N.

In some embodiments, n is greater than N.

In some embodiments, there are no direct connections between computer devices of the first class, or between computer devices of the second class, in the cluster.

In some embodiments, the computer may comprise a second cluster of n computer devices of the first class and N computer devices of the second class, where n is greater than two, and N is greater than two and wherein each computer device of the second class is connected to the n computer devices of the first class via respective fixed links, and each computer device of the first class is connected to the N computer devices of the second class via respective fixed links, the computer comprising at least one cluster connecting link which is connected between a computer device of the first class in the first cluster and a computer device of the first class in the second cluster.

In some embodiments, the computer may comprise a switch fabric, wherein at least one of the devices of the first class in the first or second cluster comprises a system connection configured to connect that device of the first class to the switch fabric.

In some embodiments, each device of the first class has a system connection configured to connect that device to the switch fabric.

In some embodiments, each device of the first class comprises a host connector configured to connect that device to a host.

In certain embodiments of the present disclosure, any processor chip may access any memory attached to any of the fabric chips in a computer cluster. The memory access may be through high-speed serial links. Further, any processor may exchange packets with any other processor in the computer, via the routing logic of the fabric chips.

In certain aspects of the disclosure, the inventor has enabled a cluster of processing chips in multiple hierarchies.

In certain aspects of the disclosure each processing chip itself has improved processor core area for a particular size of substrate.

According to another aspect there is provided a method of routing packets in a computer system comprising at least one cluster of processor chips, the method comprising:
    transmitting a packet from a designated external port of a first processor chip, the external port being connected to a memory attachment and routing chip of the cluster wherein the packet contains destination information;
    at routing logic of the memory attachment and routing chip, determining from the destination information that the packet is destined for one of:
        (i). memory attached to the memory attachment and routing chip; and
        (ii). a component attached to an external port of the memory attachment and routing chip; and
    based on the determination, in case (i) routing the packet to a memory controller of the memory attachment and routing chip and in case (ii) routing the packet to the external port of the memory attachment and routing chip.

Another demand which is imposed on high performance compute is the ability to have high bandwidth access to high-capacity memory. So-called high bandwidth memories (HBMs) are presently implemented by providing memory within the physical structure of a processing node itself. That is, the memory is provided in close proximity to the processing chip which is implemented on a silicon substrate within a package which forms the processing node. In practice, the HBM is butted up against a processing chip on a silicon substrate to be as physically as close as possible to the processing chip which provides the processing function. High bandwidth has been achieved in this way, but there is a limit on memory capacity based on the physical size of the memory which can be accommodated in this kind of structure. Moreover, such HBMs are expensive to manufacture.

In the field of Artificial Intelligence (AI) and Machine Learning (ML), the mathematical models can be extremely large, requiring very high capacity memories to accommodate them. As model size increases, so does the expense of providing HBM.

Presently, the lack of availability of a high-capacity, high bandwidth memory poses constraints on the size and nature of models which can be utilised in machine learning/artificial intelligence computers. In particular, the knowledge capacity of a model is a function of the capacity of reasonably accessible memory. In some embodiments of the disclosure, parts of the beachfront are no longer used for connections to external memories, and may be made available to HBM.

For a better understanding of the present disclosure and to show how the same may be carried into effect, reference will now be made by way of example only to the accompanying drawings.

DETAILED DESCRIPTION OF EXAMPLES

There are various known ways of forming a cluster of processing chips by interconnecting the processing chips to each other.

Figure 1:
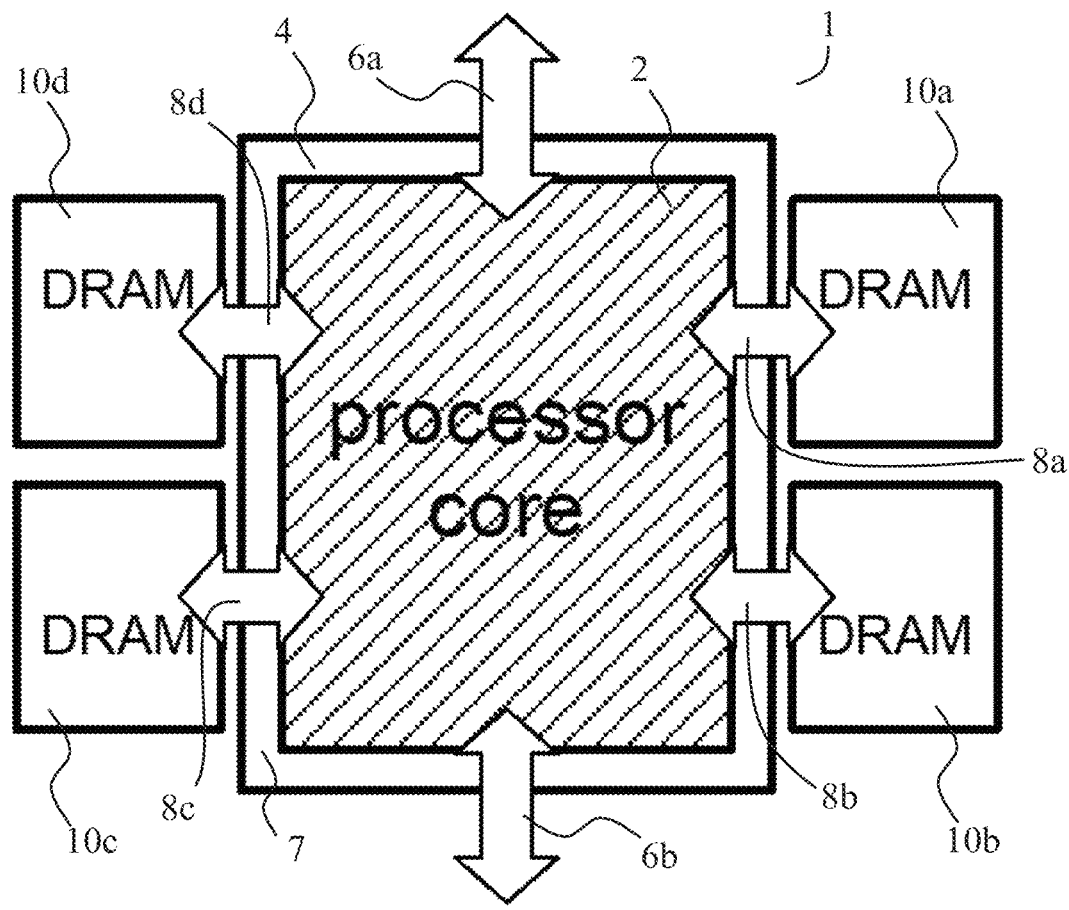
FIG. 1 is a schematic block diagram of a chip connected to memory.

FIG. 1 illustrates an example of a processor chip intended to be connected in a processing cluster. The processing chip 1 comprises a processor core 2 (shown in cross hatched)

implemented in a silicon die 4. It is convenient to distinguish between a beachfront area on which external links are provided and a core area for processing circuitry of the processor core. The beachfront area comprises inter-processor links 6a, 6b and processor-memory links 8a, 8b, 8c, 8d, which are shown in FIG. 1 connected to respective DRAMs 10a, 10b, 10c, 10d.

Figure 2:
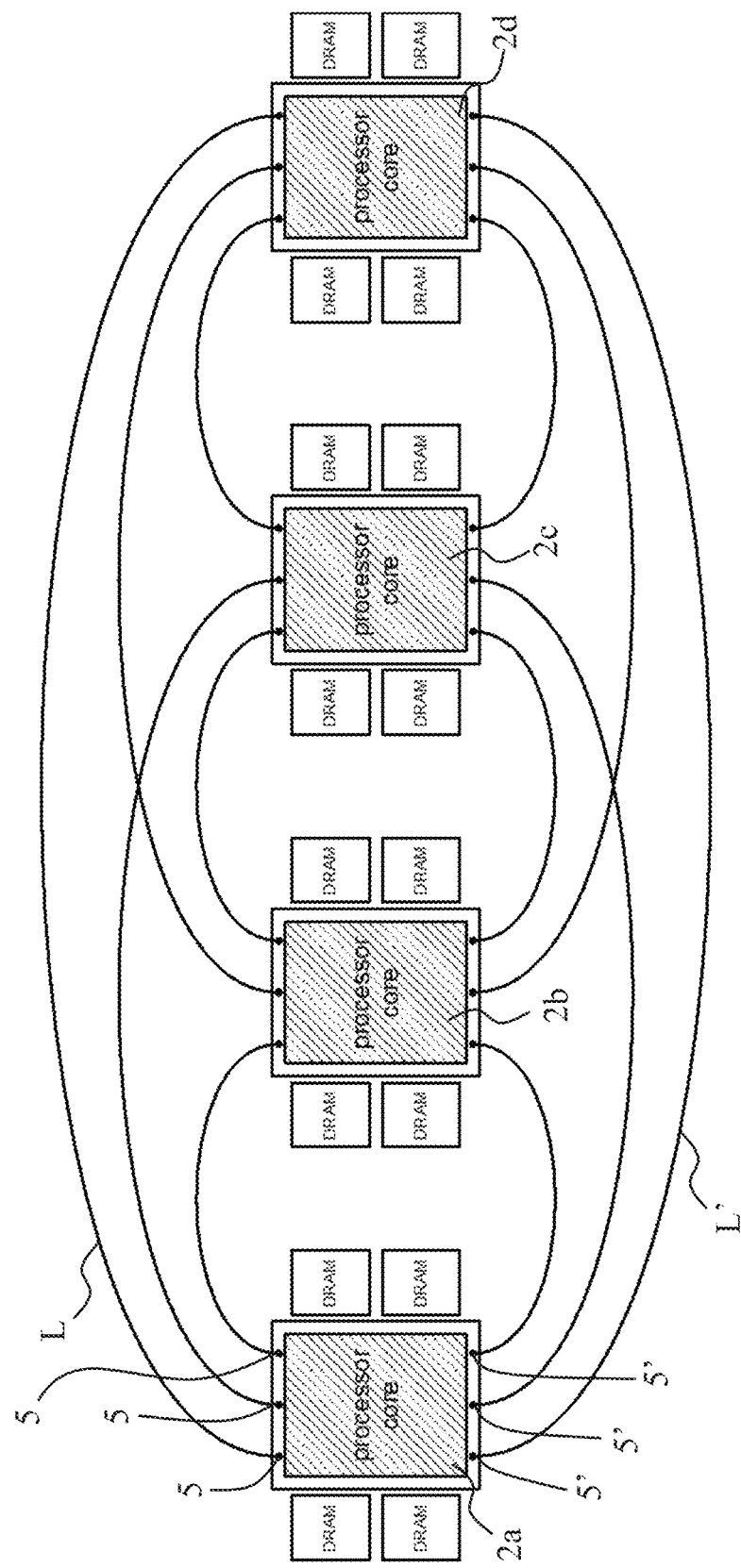
FIG. 2 is a schematic diagram of multiple interconnected chips.

FIG. 2 illustrates a cluster of four processing units of the type illustrated in FIG. 1 with all-to-all direct connectivity of inter-processor links. Each processor core 2a, 2b, 2c, 2d is shown having three external connectors 5 along an upper edge and three external connectors 5' along a lower edge. In the cluster of FIG. 2, each processor core is connected to each other processor core by two external connecting links attached to the external connectors in an illustrated manner. See for example links L and L' connecting processor core 2a to processor core 2d. Note that there remains the need for dedicated processor chip-memory busses to attach the DRAMs.

This is just one example of inter-processor connectivity in a cluster.

Figure 3:
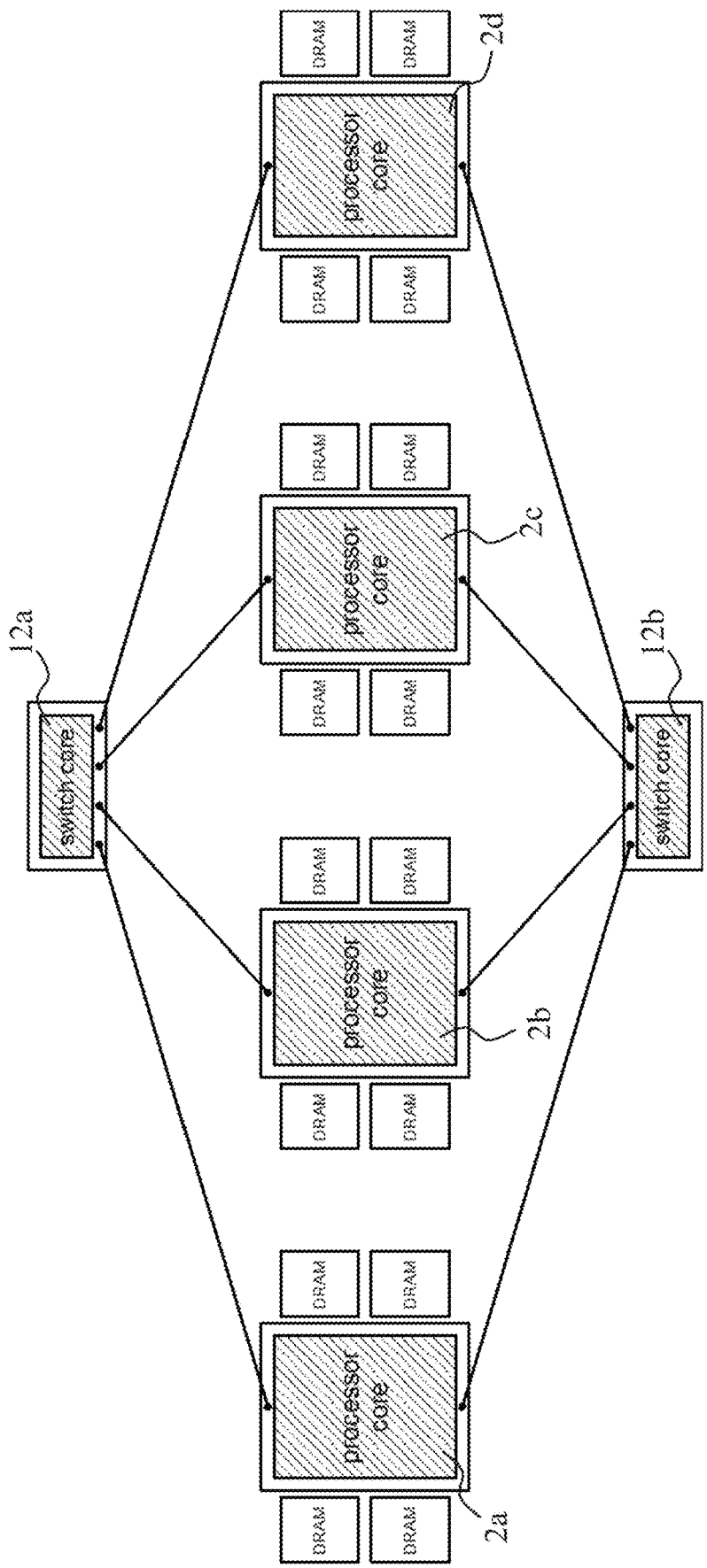
FIG. 3 is a block diagram of multiple processor chips connected using switch cores.

An alternative way of connecting processor chips together in a cluster is to use switch fabrics. FIG. 3 is a schematic diagram illustrating the connection of four processor cores 2a, 2b, 2c, 2d to each of two respective switch cores 12a, 12b. Each switch core can be caused to route traffic between particular processor cores, under program control. In this arrangement, each processor has access to its own externally connected DRAM.

In the above-described examples, each processing chip had access to memory. In some previous examples, that memory may be externally connected memory connected to each processor core of the cluster and/or high bandwidth memory (HBM) connected within a processor package. In either case, the attachment of memory uses 'beachfront' of the die.

In certain embodiments of the present disclosure, a computer comprises a plurality of processor chips and fabric chips, arranged in clusters. The fabric chips act as memory attachment and routing chips. Within a cluster, each processor chip is connected to all of the fabric chips, and each fabric chip is connected to all of the processor chips in an all-to-all bipartite connected configuration. There are no direct connections between the fabric chips themselves in a cluster. Further, there are no direct connections between the processor chips themselves. Each fabric chip has routing logic which is configured to route incoming packets from one processor chip to another processor chip which is connected to the fabric chip. Furthermore, each fabric chip has means for attaching to external memory. The routing logic is capable of routing packets between a processor connected to the fabric chip and memory which is attached to the fabric chip. The fabric chip itself comprises a memory controller which performs memory control functions for governing memory accesses from and to memory attached to the fabric chip.

In certain embodiments, further described herein, clusters of processing chips and fabric chips may themselves be interconnected to form a larger computer system. Each processor chip within a cluster may access any of the memory attached to any of the fabric chips within the cluster. This significantly enhances the memory capacity which is rendered available to any particular processor chip.

The connection configuration described herein has the further merit that in certain embodiments, it is not necessary to use all of the edges of a processor die for surfacing external connections.

Figure 4:
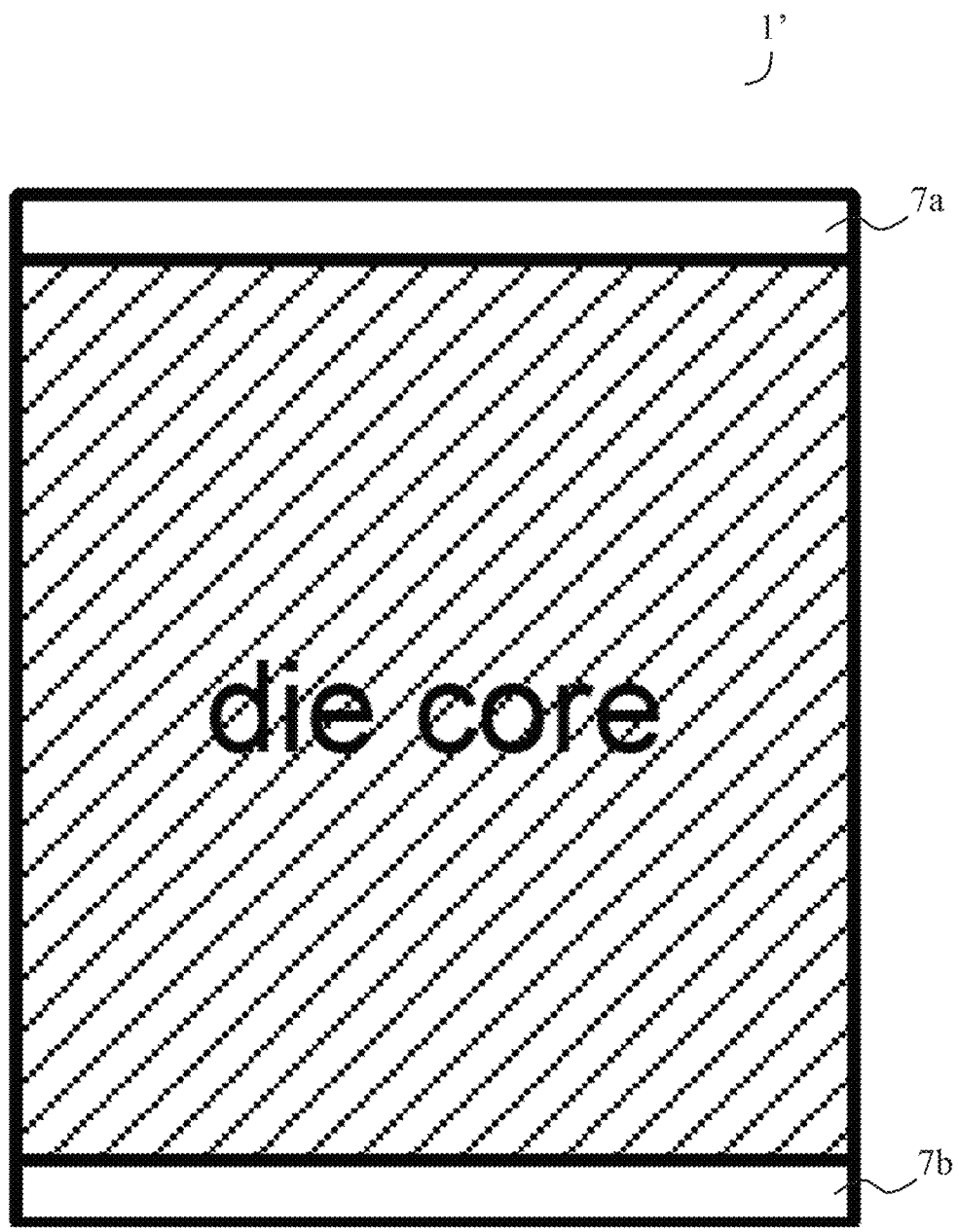
FIG. 4 is a schematic block diagram of a processor chip with reduced beachfront.

The present inventor has recognised that it is advantageous to limit the beachfront required for connectivity to fewer than all of the four edges of the die, thus, releasing more of the silicon for the manufacture of processing "core". For example, if only the short edges of a full reticle die are used for IO, then the area available for processor core on the chip increases to about 88% of the total die area, which is about 19% more than in the four sides case. FIG. 4 illustrates an example of such a chip 1' in which the longitudinal edges do not accommodate beachfront, but where the upper and lower edges each have a beachfront 7a, 7b.

The connectivity requirements of prior art processing clusters involves an all-round beachfront (such as shown in FIG. 1). Certain implementations of the present connected configurations described herein enable use of a processor die with beachfront only on the upper and lower edges, and with no beachfront on the longitudinal edges (as shown in FIG. 4).

Figure 5:
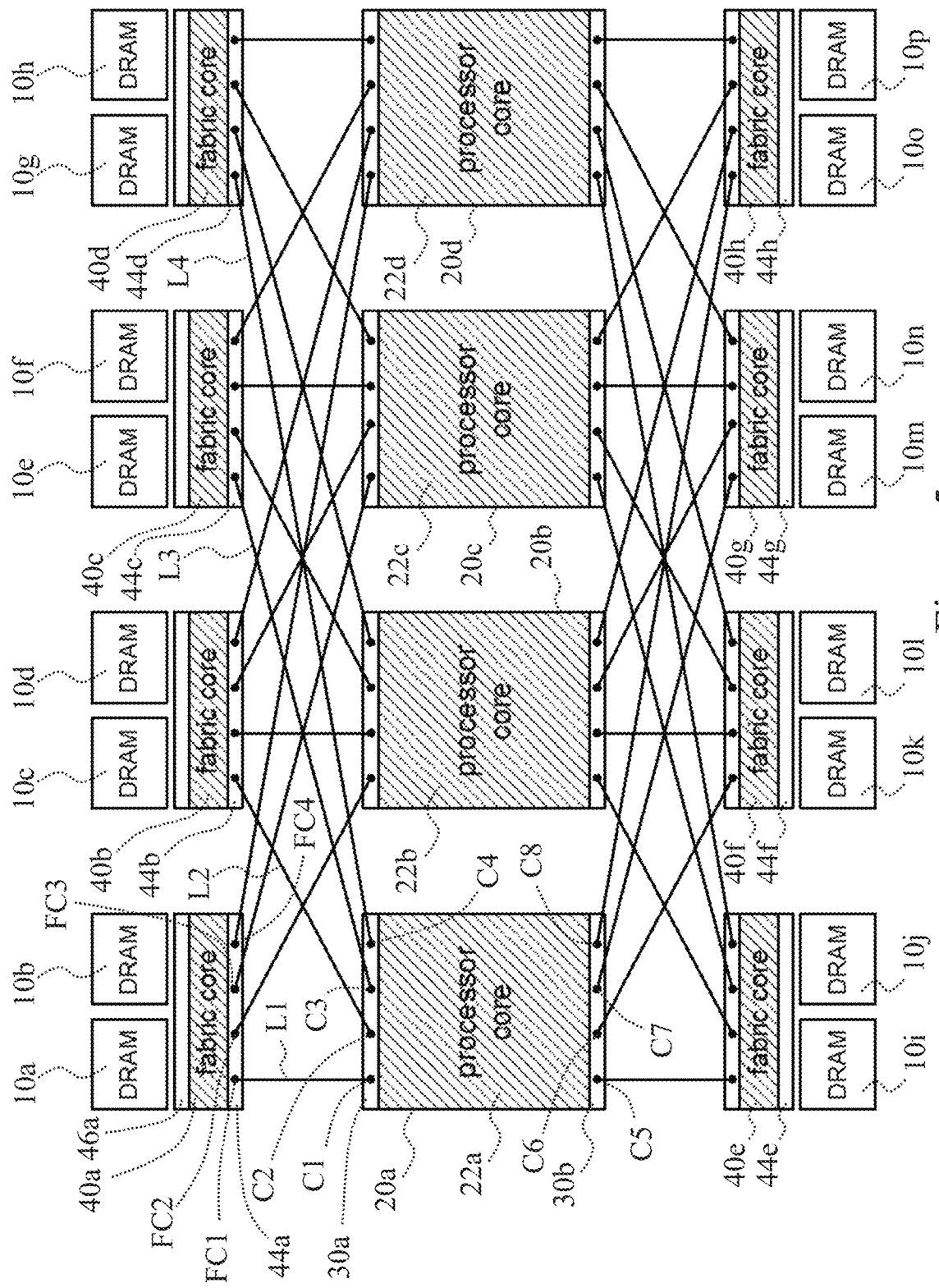
FIG. 5 is a schematic block diagram of a computer comprising interconnected processor chips and fabric chips.

In accordance with the presently described example of the present disclosure, multiple processors are connected in a cluster using one or more "fabric chips". Each fabric chip provides access to external memory (e.g. DRAM) and also provides routing of inter-processor traffic. Reference is made to FIG. 5. FIG. 5 illustrates four processor chips 20a, 20b, 20c, 20d. Each processor chip comprises a processor core area 22a, 22b, 22c, 22d which extends to each longitudinal edge of the chip. Each processor chip has an upper beachfront area 30a and a lower beachfront area 30b (shown for chip 20a only). The upper beachfront area 30a has a set of external port connections C1, C2, C3, C4 (labelled only on processor chip 20a). It will be evident that each processor chip also has four external port connections on the upper beach front area. The lower beachfront area of each processor chip similarly has four external port connections labelled C5, C6, C7, C8. Note that the lower set of external port connections is a labelled only on the processor chip 20a. It is evident that the other processor chips similarly each have a set of external port connections on their lower beachfront areas.

The cluster of FIG. 5 further comprises eight "fabric chips". Each fabric chip comprises a fabric core 40a, 40b . . . 40h. Each fabric chip has a lower beachfront area 44a . . . 44h which has a set of external ports. These external ports are provided in port connections labelled on fabric chip 40a only as FC1, FC2, FC3, FC4. It is apparent that each fabric chip has a corresponding set of external ports on each lower beachfront area. The upper beachfront area of each fabric chip is provided with one or more memory attachment interface which enables the fabric chip to connect to one or more memory, illustrated in FIG. 5 as respective DRAMs 10a, 10b, 10c, 10d . . . to 10p. For example, the fabric core 40a shown in FIG. 5 is connected to two DRAMS 10a, 10 by suitable memory attachment interfaces provided on the upper beachfront 46a of the fabric chip. Other high capacity memories may be connected, for example Double Data Rate DRAMs (DDRs) and later manifestations thereof such as Low Power DDRs (LPDDRs). The high bandwidth connectivity between processor chips and fabric chips within a cluster is "all-to-all bipartite". This means that each processor chip is connected to every fabric chip, and each fabric chip is connected to every processor chip. Connections are via links such as L1 between a processor port in a port connection, such as C1, and a fabric chip port in a port connection, such as FC1. Note, however, that in the example shown there are no direct high bandwidth connections between processor chips, or between fabric chips within the cluster. Moreover, in the example shown, there is no externally attached memory directly connected to each processor (although there may be High Bandwidth Memory within a chip package-see later). Each fabric chip provides a routing function which provides pathways between every pair of processors, and between each processor and the memory attached to the fabric chip.

Furthermore, the links could be manifest in any suitable way. Note that the links are fixed links that is they provide a point to point connection. Each link can be connected or reconnected to different ports to set up a computer configuration. Once a computer configuration has been set up and is in operation, the links are not multiplexable and do not fan in or fan out. That is, there are no intermediate switches-instead a port on a processor is directly connected to an end port on the fabric chip. Any packet transmitted over a link will be received at the port at the other end of the fixed link. It is advantageous that the links are bi-directional and preferable that they can operate in both directions at once, although this is not an essential requirement. One particular category of communication link is a SERDES link which has a power requirement which is independent of the amount of data that is carried over the link, or the time spent carrying that data. SERDES is an acronym for Serializer/DeSerializer and such links are known. For example, a twisted pair of wires may be used to implement a SERDES link. In order to transmit a signal on a wire of such links, power is required to be applied to the wire to change the voltage in order to generate the signal. A SERDES link has the characteristic that there is a fixed power for a bandwidth capacity on a SERDES link whether it is used or not. This is due to the need to provide clocking information on the link by constantly switching the current or voltage state of the wire(s) even when no data is being transmitted. As is known, data is transmitted by holding the state of the wire(s) to indicate a logic '0' or logic '1'. A SERDES link is implemented at each end by circuitry which connects a link layer device to a physical link such as copper wires. This circuitry is sometimes referred to as PHY (physical layer). In the present example, packets are transmitted over the links using Layer 1 and Layer 2 of an Ethernet protocol. However, it will be appreciated that any data transmission protocols could be used.

There are several advantages to the computer described herein.

It is no longer necessary to dedicate a fixed proportion of processor beachfront (and therefore IO bandwidth) to fixed capacity memory or to inter-processor connectivity. All processor IO bandwidth passes via the fabric chips, where it can be used on-demand for either purpose (memory or inter-processor).

Under some popular models of multiprocessor computation, such as bulk synchronous parallel (BSP), the usage of peak DRAM bandwidth and peak inter-processor bandwidth might not be simultaneous. The total bandwidth requirement may therefore be satisfied with less processor beachfront, providing the processor chips with more core area. BSP in itself is known in the art. According to BSP, each processing node performs a compute phase and an exchange phase (sometimes called communication or message passing phase) in an alternating cycle. The compute phase and exchange phase are performed by the processing chips executing instructions. During the compute phase, each processing unit performs one or more computation tasks locally, but does not communicate any results of these computations to the other processing chips in the cluster. In the exchange phase, each processing chip is allowed to exchange one or more results of the processing from the preceding compute phase to and/from one or more others of the processing chips in the cluster. Note that different processing chips may be assigned to different groups for synchronisation purposes. According to the BSP principle, a barrier synchronisation is placed at the juncture transitioning from the compute phase into the exchange phase, or the juncture transitioning from the exchange phase into the compute phase, or both. That is, to say either all processing chips are required to complete their respective compute phase before any in the group is allowed to proceed to the next exchange phase, or all processing chips in the group are required to complete their respective exchange phase before any processing chip in the group is allowed to proceed to the next compute phase, or both of these conditions are enforced. This sequence of exchange and compute phase is repeated over multiple cycles. In BSP terminology, each repetition cycle of exchange phase and compute phase may be referred to as a "superstep".

This has the practical effect that there are circumstances when there is no simultaneous usage of all links required for accessing memory (for the purpose of completing a compute phase) and links used to exchange data between the processing chips in an exchange phase. As a consequence, there is maximum efficient use of the fixed links, without compromising memory access times or inter-processor exchange delays. It will nevertheless be appreciated that embodiments described herein have applications other than when used with BSP or other similar synchronisation protocols.

It is possible that the links could be dynamically deactivated to consume effectively no power while not in use. However, the activation time and non-deterministic nature of machine learning applications generally render dynamic activation during program execution as problematic. As a consequence, the present inventor has determined that it may be better to make use of the fact that the link power consumption is essentially constant for any particular configuration, and that therefore the best optimisation is to maximise the use of the physical links by maintaining concurrent inter processor and processor-memory activity as far as is possible.

All of the memory in the cluster is accessible to each processor without indirection via another processor. This shared memory arrangement can benefit software efficiency.

In the example shown in FIG. 5, there are two "ranks" of fabric chips, each attached to a respective upper and lower edge of the processor chip. The upper rank comprises fabric cores 40a . . . 40d, connected by respective links to each of the processor cores. For example, the processor core 20a is connected to fabric core 40a by link L1, fabric core 40b by link L2, fabric core 40c by link L3 and fabric core 40d by link L4. The lower rank comprises fabric cores 40e . . . 40h. The fabric core 40a is also connected to each of the processor cores 20a . . . 20d, by corresponding links (which are shown but not labelled in the Figure for reasons of clarity). There is no use of the longitudinal processing chip edge for beachfront.

However, there are different design choices within the overall concept. For example, the long edges of the processors could be used to provide more bandwidth to the fabric chips, and all the links emerging from the beachfront of the processor chips could be passed to a single rank of fabric chips, or to three ranks etc.

The number of fabric chips in each rank may differ from the number of processor chips. What remains important to achieve the advantages of the disclosure is that the all-to-all bipartite connectivity between the processing chips and the fabric chips is maintained, with the routing functionality and external memory access provided by the fabric chips.

Figure 6:
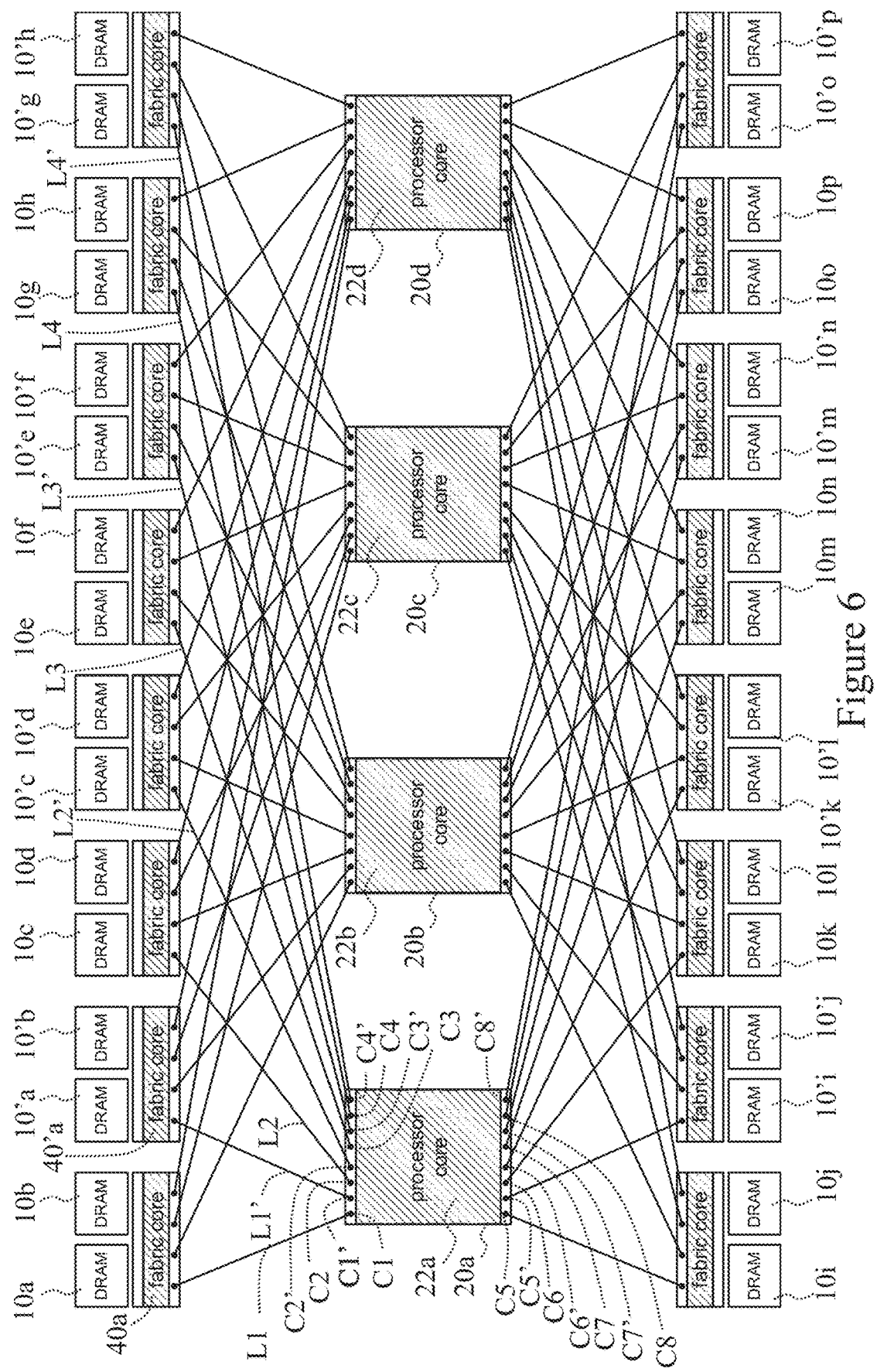
FIG. 6 is a schematic block diagram of a computer comprising interconnected processor chips and fabric chips, with a higher ratio of fabric chips to processor chips.

FIG. 6 shows a particular example in which four processing chips are connected to an upper rank of eight fabric chips and a lower rank of eight fabric chips. Each processing chip is connected to sixteen fabric chips. Take for example the processor chip 20a. This has eight upper link connectors C1, C1', C2, C2', C3, C3', C4, C4', each one connected by respective links L1, L1', L2, L2', L3, L3', L4, L4' to a respective link connector on a respective fabric core, two of which are labelled in FIG. 6 as 40a, 40a'. The processor chip has eight lower link connectors C5, C5', C6, C6', C7, C7', C8, C8' connected to respective link connectors on each of eight fabric chips in the lower rank. Each fabric chip is connected to four processor chips.

Note that the use of the external connectors to provide the all-to-all bipartite connectivity in the cluster according to examples of the present disclosure does not rule out the presence of other I/O ports on the processor chips or the fabric chips. For example, certain ones of the processor chips or fabric chips in the cluster may be provided with an I/O port enabling connectivity between multiple clusters or to host devices etc. In one embodiment described with reference to FIGS. 8 and 9, the fabric chips provide this additional connectivity.

Figure 7:
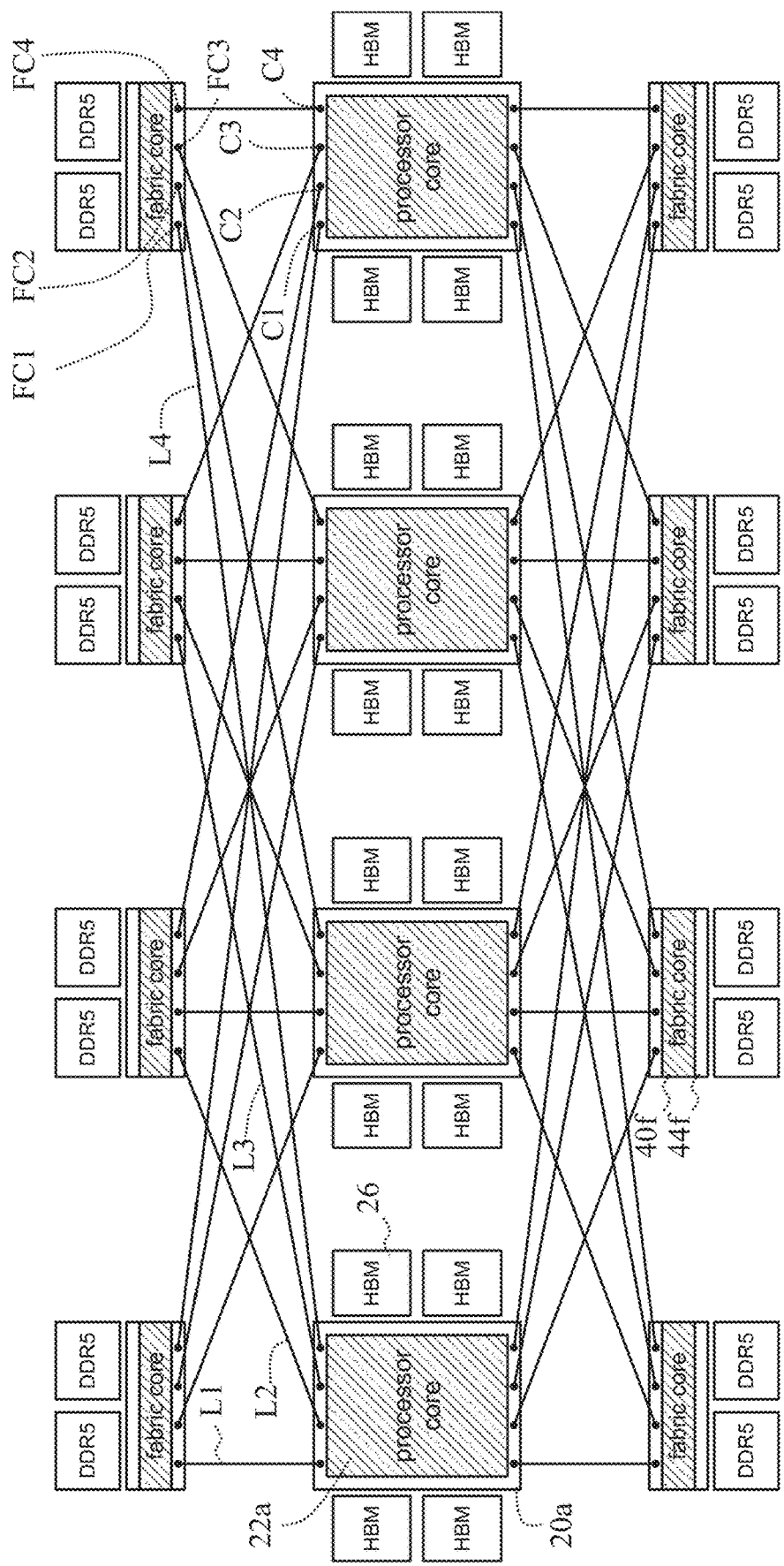
FIG. 7 is a schematic block diagram of a computer comprising interconnected processor chips and fabric chips, each processor chip associated with high bandwidth memory.

Furthermore, note that additional memory may be attached directly to the processor chips, for example along the longitudinal edges. That is, additional High Bandwidth Memory (HBM) may be provided in close proximity to the processing chip which is implemented on a silicon substrate within a package which forms a processing node. In practice, the HBM is butted up against a processing chip on a silicon substrate to be as physically as close as possible to the processing chip which provides the processing function. For example, high bandwidth memory (HBM) could be attached to the processor chips, while high-capacity memory could be attached to the fabric chips-thus, combining the advantages of both memory types in the cluster. FIG. 7 illustrates an embodiment in which high bandwidth memory (HBM) modules 26 are attached to the east and west edges of each processor chip 20'a, 20'b, 20'c, 20'd. In other respects, the computer illustrated in FIG. 7 has the same connectivity as that described in FIG. 5. Attachment of HBM 26 may be by short parallel connections of a memory bus formed in a substrate, or using a silicon bridge in a package substrate.

In the examples of the computers described herein, the processor chips 20 are not intended to be deployed on a standalone basis. Instead, their deployment is within a computer cluster in which the processor chips are supported by one or more fabric chip 40. The processor chips 20 connect to one another through the fabric chips 40, enabling use of all of the processor chip links L1, L2 etc. for use simultaneously as processor-to-processor links and memory access links. In this way, the computer offers a higher capacity fast memory system when compared against existing computer systems. In current computer systems, it will become increasingly expensive to provide high capacity, high bandwidth memory. Furthermore, there remain limits on the processing power which can be obtained while delivering high bandwidth memory access and high-capacity memory. The present computer may enable those limits to be exceeded.

By providing routing logic on the fabric chip, it is not necessary for the processor chip to have routing logic for the purposes of external routing functions. This allows silicon area to be freed up to maximise the per processor chip I/O bandwidth and also to maximise area available for processing circuitry within the processor core.

By locating link ports along the north and south edges, this releases the east/west edges. This either allows the processor core to extend into the east/west edges, thereby maximining the processing capability, or allows the east/west edges to be kept free for high bandwidth memory integration.

The computer may be operated in different topologies. In one example, a group of four processor chips and eight fabric chips (as illustrated for example in FIG. 5) may constitute a cluster. Within a cluster, each group of four fabric chips connected to one of the processor chip edges is referred to herein as a rank. The cluster of FIG. 5 contains two ranks.

A pod may comprise multiple clusters. Clusters may be interconnected within a pod using a processor facing link on the fabric chip. Pods may be interconnected to each other using a pod facing link on the fabric chip. These are shown in more detail in FIG. 9 which illustrates the fabric chip.

Figure 8:
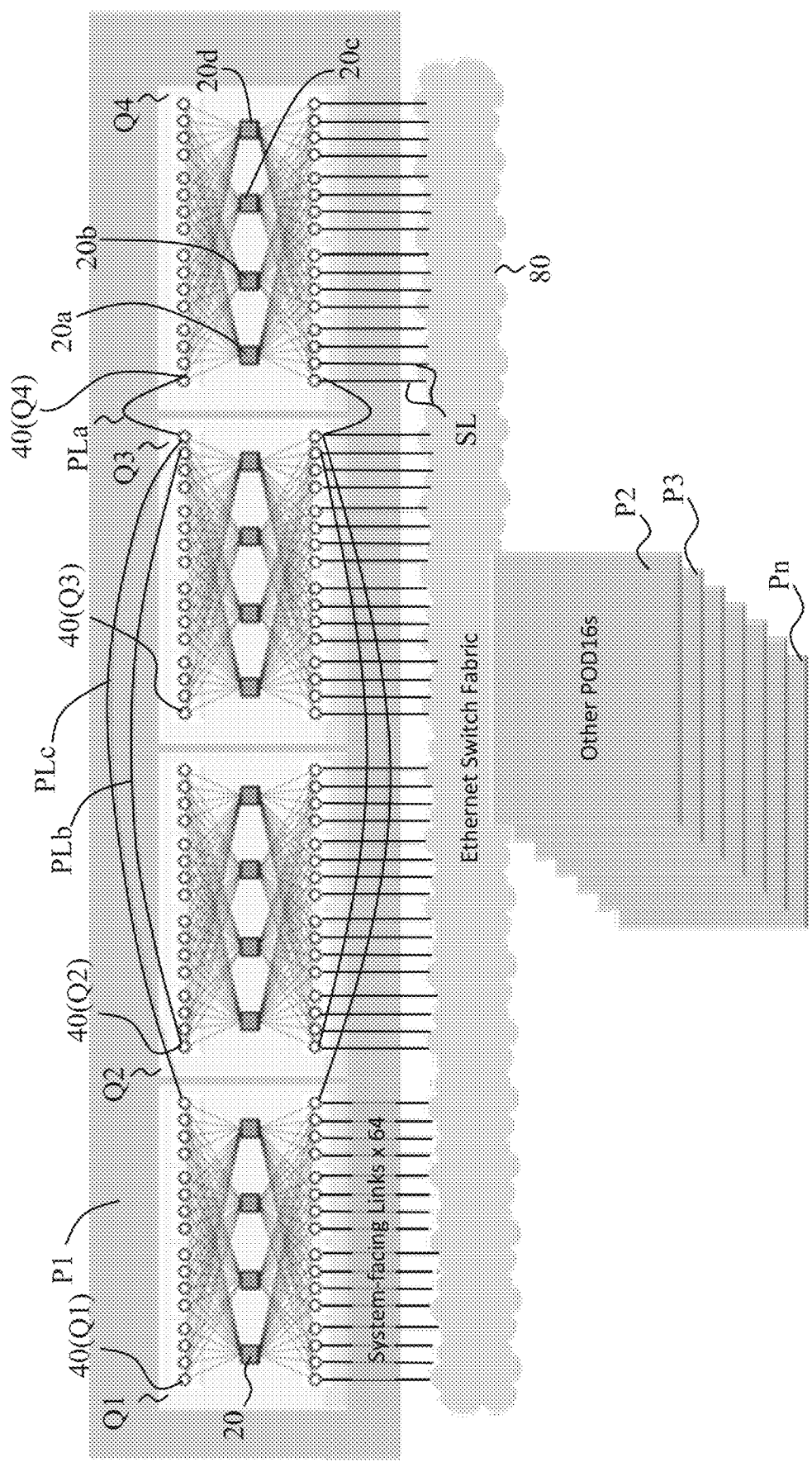
FIG. 8 is a schematic block diagram of a computer comprising a set of interconnected clusters.
Figure 9:
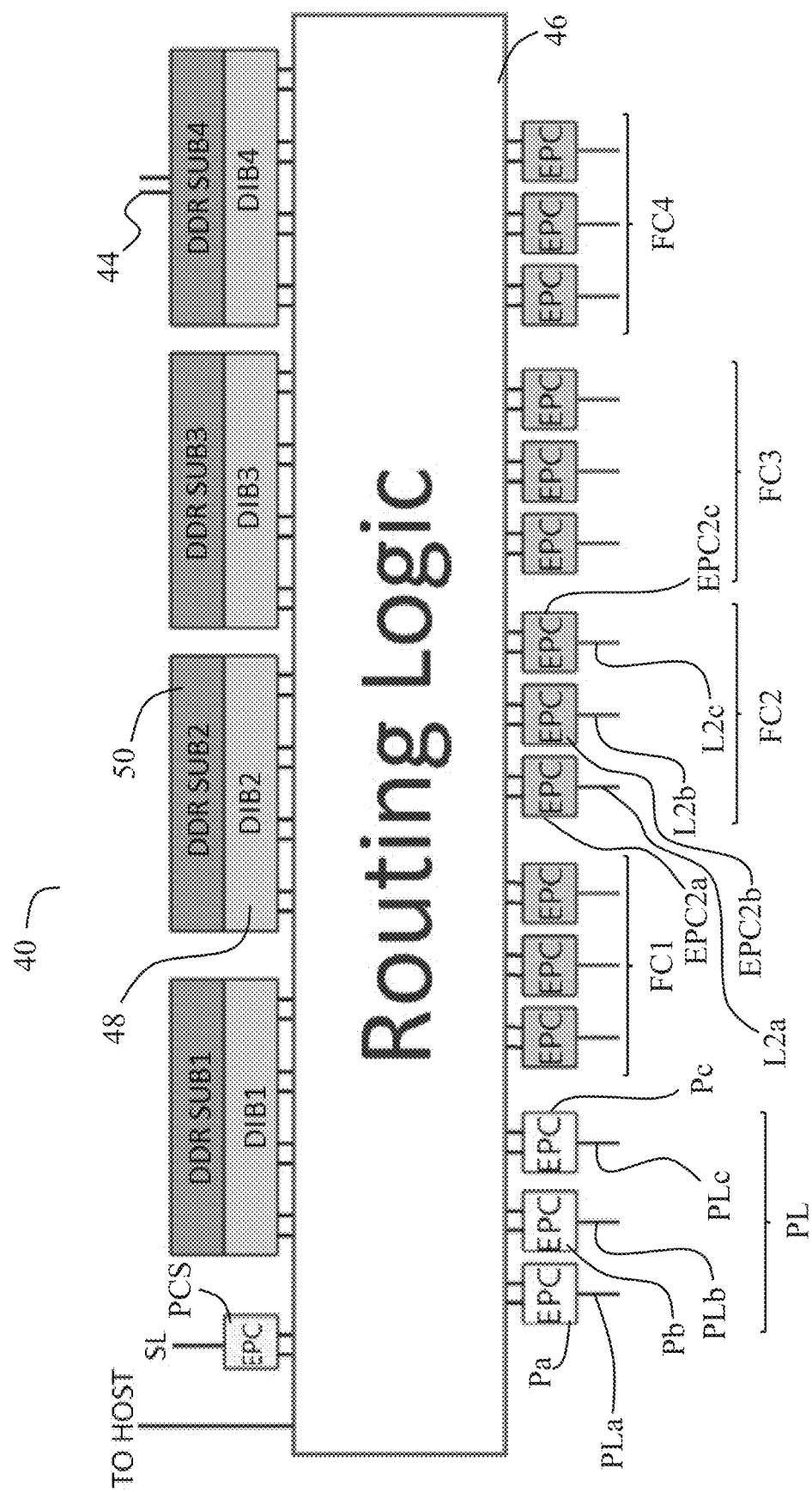
FIG. 9 is a schematic block diagram of a fabric chip.

FIG. 8 is a schematic overview of a system topology and hierarchy according to one embodiment. FIG. 8 illustrates multiple pods P1, P2, P3 . . . . Pn (labelled POD 16). In the example of FIG. 8, n=8, but it will readily be appreciated that different numbers of pods may be connected into a computer system using the techniques described herein. One of the pods P1 is shown in detail. The pod P1 comprises four clusters Q1, Q2, Q3, Q4. In the example of FIG. 8, each cluster comprises four processor chips 20a, 20b, 20c, 20d sharing thirty-two fabric chips. One fabric chip 40 (Q4) is labelled in FIG. 8 Q4 denoting that that fabric chip 40 (Q4) is in the cluster Q4. Other fabric chips are similarly labelled 40 (Q1), 40 (Q2) and 40 (Q3). As shown in FIG. 8, in each cluster Q1, Q2, Q3, Q4, four processor chips 20a, 20b, 20c, 20d are connected to thirty two fabric chips in an all-to-all bipartite arrangement. That is, as described above, each fabric chip in the cluster is connected to all four processor chips, and each processor chip is connected to all thirty two fabric chips. Each processor chip has thirty two port connections C1, C2 . . . . C32, sixteen on the upper edge and sixteen on the lower edge. As illustrated in FIG. 9, in certain embodiments, each port connection provides three bi-directional serial links, making a total of ninety-six processor links. Each set of twelve of a processor's external links (out of ninety-six links) connects to a respective set of four of the fabric chips (three processor links to each fabric chip port connection FC). Eight sets of twelve links thus connect to eight sets of four fabric chips within a cluster. The four clusters Q1, Q2, Q3, Q4 are grouped to form a pod, using pod facing links of the thirty-two fabric chips within each cluster. Each cluster exports three bundles each of 32 links, with each bundle connecting to each of the other three clusters. A bundle of pod facing links between two clusters includes one link between each of the thirty two corresponding peer fabric chips in the two clusters. Certain of the pod facing links may be connected to third party ethernet switches 80.

FIG. 9 is a schematic block diagram of components on a fabric chip 40. As shown in FIG. 9, routing logic 46 is connected to the DDR interface blocks 48 for transferring data packets between DDR interface block 48 and the other ports. The routing logic 46 is further attached to each processor connected link port. Each port comprises an ethernet port controller EPC. The routing logic is attached to ethernet port controllers of the pod facing ports, and to an ethernet port controller of a system facing link. The routing logic 46 is further attached to a PCI complex for interfacing with a host system. PCIe (Peripheral Component Interconnect Express) is an interface standard for connecting high speed computers.

FIG. 9 illustrates an example of a fabric chip which, in addition to enabling inter-processor communication, and processor-to-memory communication, enables a computer to be constructed by connecting together computer clusters in a hierarchical fashion. Firstly, the components of the fabric chip which are used for implementing the inter-processor communication, and the processor-to-memory communication will be described. Each fabric core port connection comprises three serial links. Each serial link comprises a port with an ethernet port controller (EPC). As mentioned, these links may be SERDES links, for example, twisted wire pairs enabling serial packet communication.

For reasons of clarity, not all of the components in FIG. 9 are illustrated with associated references. Each of the fabric core connections FC1, FC2, FC3 and FC4 have a configuration as now herein described with reference to fabric core port connection FC2 which connects to the second processor (for example processor 20b in FIG. 6). The fabric connection FC2 comprises three links L2a, L2b, L2c, each comprising an ethernet port controller EPC2a, EPC2b, EPC2c respectively. Note that in other embodiments, a single physical link may be provided, or a different number of physical links may be provided in each fabric chip connection FC. Note that the link labelled L2 in previous Figures may therefore comprise three individual serial links (such as L2a, L2a and L2c). Routing logic 46 in the fabric chip 40 may be implemented as a ring router, cross bar router or in any other way. The fabric chip is further connected to external memories (such as DRAMS 10A, 10B etc.) (not shown in FIG. 9). Although two DRAMS are shown in the previous Figures, in the embodiment of FIG. 9, the fabric chip is connected to four DRAMS. In order to make this connection, the fabric chip comprises four DRAM interface blocks DIB1, DIB2, DIB3 and DIB4, each associated with four DDR sub connection layers DDR sub1, DDR sub2, DDR sub3 and DDR sub4. Each DDR interface block DIB 48 incorporates a memory controller which manages access to the memory 50 which is attached to the block. One memory attachment interface 44 is shown in FIG. 9, but it will be appreciated that each DDR sub layer has a respective memory attachment interface for attaching to external DRAM. The routing logic 46 is configured to route memory access packets received from an attached processor core to the addressed one of the data interface blocks DIB1 to DIB4. The routing logic 46 is further configured to route packets from one attached processor chip to another attached processor chip via the respective fabric chip ports.

In certain embodiments, the routing logic prevents a memory packet (such as a memory access response packet) from being routed from one memory attachment interface to another memory attachment interface. A memory response packet in such embodiments may only be routed to a processor chip via the correct port attached to the routing logic 46. For example, incoming packets on link L2a of fabric core port connection FC2 will be routed, based on routing information in the packet, to the addressed port connected to the routing logic 46. For example, if the packet is intended to be routed to the processor 20c, the routing logic 46 will identify the processor 20c from the routing information in the packet and cause the packet to exit through the ethernet port controller onto the link attached to the processor 20c.

Should the packet be a memory access packet, the routing logic routes the packet based on the memory address in the packet to its appropriate DDR interface block. Note that in this embodiment each DDR interface block DIB1 . . . . DIB4 comprises four memory access channels. It will be appreciated that any number of memory access channels may be provided by each interface block DIB1 . . . . DIB4. The memory access channels are managed by the memory controller in each data interface block DIB1 . . . . DIB4.

As explained above, in the example shown in FIG. 9, the fabric chip 40 has additional components which allow a computer to be made up of interconnected clusters. To this end, the fabric chip comprises a pod facing port connection PL. The pod facing port connection PL comprises three ports, each port comprising an ethernet port controller Pa, Pb, Pc connected to a respective link PLa, PLb, PLc. The routing logic detects packets whose packet information indicates that the packets should not be routed to a processor within this cluster, but should instead be routed to a processor of another cluster, and routes the packet to one of the pod facing ports. Note that the pod facing port connection PL may transmit packets to a corresponding pod facing port in a fabric chip on another cluster, or may receive packets from a corresponding pod facing port on a fabric chip of another cluster.

The fabric chip of FIG. 9 also permits a packet to be routed to another pod within a system. To this end, a system port SL is provided. The system port comprises a corresponding ethernet port controller EPC, labelled PCS, and is connected to a system's serial link which is connected to a corresponding port in another pod. The routing logic may determine that a packet is intended for routing to another pod in the system and transmit the packet to the system port SL. Packets may be received over the system port SL from a corresponding system port of another fabric chip in another pod in the system which is connected via a system serial link, and be applied to the routing logic.

It will be appreciated that any type of routing logic could be utilised to route traffic from one external connection of the fabric chip to another connection of the fabric chip, either to another processor chip via an external port or to attached memory via a memory attachment interface. The term data packet when used herein denotes a sequence of bits comprising a payload to be transmitted either between processor chips or between a processor chip and memory attached to a fabric chip. The packets include information, such as destination identifiers and/or memory addresses for routing purposes. In some embodiments, a destination processor identifier may be included in a packet header. One type of ring routing logic is described in Graphcore's GB patent application no. GB2115929.8.

In certain embodiments there are no identifiers for memory access packets within a POD other than the memory address to be accessed by the packet. An address range of 32 TB is split over a set of fabric chips in a POD, and whether a packet routes to a memory interface or whether it routes to a port, on any given fabric chip, depends on the address in the packet and the range of addresses assigned to each fabric chip.

Packets to be routed between processors, so called inter processor packets differ from memory access packets. Inter processor packets have identifiers which identify which processor (and possibly which tile within a processor is being targeted).

Both types of packet (memory and inter processor) may comprise additional information to route between pods, in the form of an additional identifier (DOMAINID) in a DOMAIN ID field.

The fabric chip carries out its routing function as follows:

An incoming packet first routes to the correct POD using the DOMAINID field. It is possible after first entering the target POD, that it is on the wrong fabric chip and is routed onwards.

Then if it's a memory access packet it routes to the correct fabric chip using the memory address in the packet.

Or, if it's a processor to processor packet, it routes to the correct fabric chip using a processor identifier (and possibly a tile identifier) in the packet, and when it gets to the right fabric chip it is routed to a port that connects to that processor chip.

The fabric chip 40 may not act as a processor. In other words, the fabric chip 40 may act only to provide routing and memory attachment functionalities. As a consequence, the fabric chip 40 may not comprise processing logic suitable for executing instructions. Accordingly, the packets received by the fabric chip 40 are substantially unaltered by the chip 40, such that an input packet is the same as a routed output packet. In examples, the fabric chip 40 may examine the packets in order to route them, but does not perform any processing of the contents of a packet.

Figure 10:
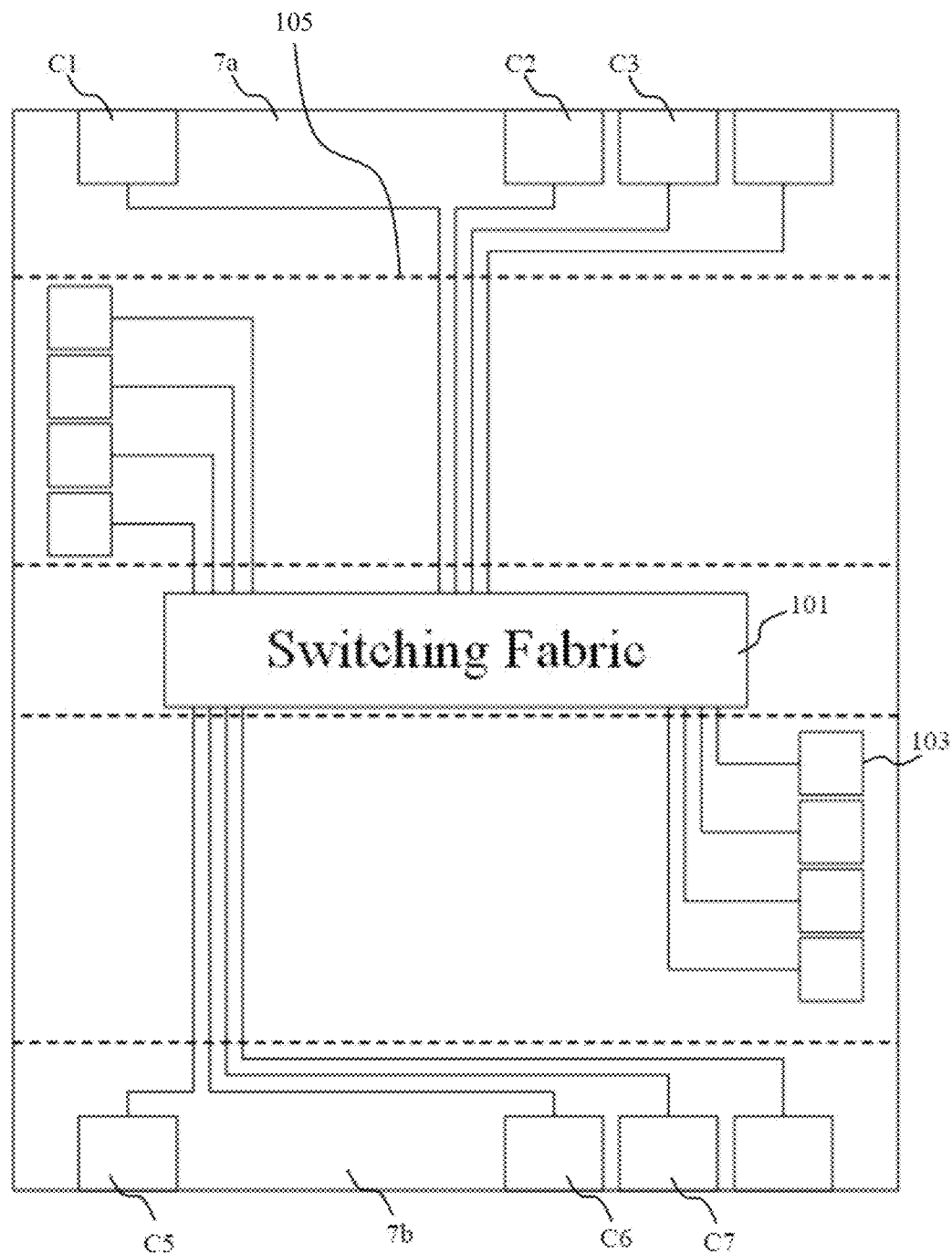
FIG. 10 is a schematic diagram of one example of a processor chip.

As described herein, each processing chip is capable of implementing a processing or compute function. There are many possible different manifestations of a suitable processing chip. Graphcore have developed a intelligence processing unit (IPU) which is describe for example in U.S. patent application Ser. Nos. 15/886,009; 15/886,053; 15/886,131 [PWF Refs. 408525US, 408526US and 408527US] the contents of which are herein incorporated by reference. FIG. 10 is a highly schematic diagram of an IPU. The IPU comprises a plurality of tiles 103 on a silicon die, each tile comprising a processing unit with local memory. The tiles communicate with each other using a time deterministic exchange. Each tile 103 has instruction storage holding a local program, an execution unit for executing the local program, data storage for holding data, an input interface with a set of input wires and an output interface with the set of output wires. A switching fabric 101 (sometimes referred to as an exchange or exchange fabric) is connected to each of the tiles by the respective sets of output wires and connectable to each of the tiles by their respective sets of input wires via switching circuitry controllable by each tile. A synchronisation module (not shown) is operable to generate a synchronisation signal to switch between a compute phase and an exchange phase. The tiles execute their local programs in the compute phase according to a common clock which may be generated on the die or received by the die. At a predetermined time in the exchange phase, a tile may execute a send instruction from its local program to transmit a data packet onto its output set of connection wires, the data packet being destined for at least one recipient tile but having no destination identifier identifying that recipient tile. At a predetermined switch time, the recipient tile executes a switch control instruction from its local program to control the switching circuitry to connect its inputs set of wires to the switching fabric to receive the data packet at a receive time. The transmit time at which the data packet is scheduled to be transmitted from the transmitting tile, and the predetermined switch time, are governed by the common clock with respect to a synchronisation signal with respect to the synchronisation signal.

The time deterministic exchange allows for efficient transfer between the tiles on the die. Each tile has its own local memory which provides the data storage and the instruction storage. As described herein, the IPU is additionally connected to external memory from which data may be transferred onto the IPU for use by the tiles via the fabric chips.

The tiles 103 of the IPU may be programmed such that a data packet that is transmitted by a SEND instruction from their local program is intended either to access memory (a memory access packet) or to have at its destination another IPU which is connected in the cluster or system. In those cases, the data packet is transmitted onto the switching fabric by the originating tile 103, but is not picked up by recipient tile within the IPU. Instead, the switching fabric causes the tile to be provided to the appropriate connector C1, C2 etc. for external communication from the IPU. The packet intended for off-chip communication is generated to include information which defines its final off-chip destination but not the external port from which it is to be transmitted. The packet may be transmitted to the external port using the principles of the time deterministic exchange to identify the external port for the packet when code is compiled for the tiles. For example, a memory access packet may identify a memory address. A packet intended for another IPU may include the identifier of the other IPU. This information is used by the routing logic on the fabric chip to correctly route the off-chip packets generated by the IPU.

The diagram in FIG. 10 shows five exemplary regions of the exemplary IPU chip, separated by four boundaries 105, represented by dashed lines. Note that the dashed lines represent abstract boundaries 105 of abstract regions on the processor chip, shown for illustrative purposes; the boundaries 105 do not necessarily represent physical boundaries on an IPU chip.

From top to bottom of the diagram in FIG. 10, the regions separated by the boundaries 105 are respectively: an upper beachfront, an upper tile region, a switching fabric region, a lower tile region, and a lower beachfront region.

It will be appreciated that the above embodiments have been described by way of example only. Other variants or use cases of the disclosed techniques may become apparent to the person skilled in the art once given the disclosure herein. The scope of the disclosure is not limited by the described embodiments but only by the accompanying claims.

The invention claimed is:

1. A memory attachment and routing chip comprising:
a single die having a set of external ports, at least one memory attachment interface comprising a memory controller and configured to attach to external memory, and a fabric core in which routing logic is implemented, wherein the routing logic is configured to (i) receive a first packet of a first type from a first port of the set of external ports, the first type being a memory access packet comprising a memory address which lies in a range of memory addresses associated with the memory attachment and routing chip, to detect the memory address and to route the first packet of the first type to the memory attachment interface, and to (ii) receive a second packet of a second type, the second type being an inter-processor packet comprising a destination identifier identifying a processing chip external to the memory attachment and routing chip and to route the second packet to a second port of the set of external ports, the second port being selected based on the destination identifier.

2. The memory attachment and routing chip of claim 1 wherein the routing logic is configured to examine an incoming packet and configured to route the incoming packet based on a determination of whether the incoming packet is a memory access packet for routing to the memory controller or an inter processor packet intended for routing to one of the set of external ports.

3. The memory attachment and routing chip of claim 1 wherein each external port of the set of external ports is connected to a link and comprises a link controller formed as a circuit in the die for controlling transmission of messages on and off the memory attachment and routing chip via the link.

4. The memory attachment and routing chip of claim 3 wherein the link comprises a Serializer/DeSerializer (SERDES) link, and the link controller comprises a circuit configured to control transmission and reception of packets over the SERDES link.

5. The memory attachment and routing chip of claim 1 wherein a first group of the set of external ports are connected to respective serial links configured for attachment to respective processor chips, wherein the routing logic is configured to detect that the second packet comprises a processor identifier to identify a particular port of the first group of the set of external ports.

6. The memory attachment and routing chip of claim 1 connected in a first computer cluster wherein at least one of the external ports of the set of external ports is attached to a cluster connecting link configured to connect to another memory attachment and routing chip in a second computer cluster.

7. The memory attachment and routing chip of claim 1 wherein at least one of the external ports of the set of external ports is connected to a system facing link configured to connect to a switching fabric, and wherein the routing logic is configured to detect a domain identifier in a third packet of the first type or the second type and to route the third packet to the system facing link.

8. The memory attachment and routing chip of claim 1 wherein the set of external ports comprises a host port connected to a link configured to connect to a host computer.

9. The memory attachment and routing chip of claim 1 further comprising multiple memory controllers, each memory controller configured to attach to a respective dynamic random access memory (DRAM) via a respective DRAM interface component formed in the die.

10. The memory attachment and routing chip of claim 9, wherein each DRAM interface is configured according to a JEDEC standard.

11. The memory attachment and routing chip of claim 1 wherein the die is of rectangular shape, the set of external ports being arranged along one long edge of the die.

12. The memory attachment and routing chip of claim 11 wherein the memory attachment interface comprises memory attachment connections configured to connect the memory controller to external memory, the memory attachment connections located along another long edge of the die.

13. The memory attachment and routing chip of claim 1 wherein the die has an aspect ratio greater than 3:1.

14. The memory attachment and routing chip of claim 1 wherein the die comprises multiple bumps for flip chip attachment of the die to a substrate, the bumps comprising a first group being in electrical connection with the external ports and a second group being in electrical connection with the memory attachment interface.

15. The memory attachment and routing chip of claim 14 wherein a third group of bumps is in electrical connection with a memory controller power supply.

16. The memory attachment and routing chip of claim 14 wherein a fourth group of bumps is in electrical connection with a chip power supply.

17. The memory attachment and routing chip of claim 1 wherein the routing logic is configured to receive a third packet of a third type having a memory address in a second range of memory addresses outside the range of memory addresses associated with the memory attachment and routing chip, configured to determine a second memory attachment and routing chip associated with a second range of memory addresses, and is configured to route the third packet to the second memory attachment and routing chip via one of the external ports.

18. A computer comprising:
a first memory attachment and routing chip and a second memory attachment and routing chip, each comprising:
a single die having a set of external ports,
at least one memory attachment interface comprising a memory controller and configured to attach to external memory, and
a fabric core in which routing logic is implemented,
wherein the routing logic is configured to:
(i) receive a first packet of a first type from a first port of the set of external ports, the first type being a memory access packet comprising a memory address which lies in a range of memory addresses associated with the memory attachment and routing chip, to detect the memory address and to route the first packet to the memory attachment interface, and
(ii) to receive a second packet of a second type, the second type being an inter-processor packet comprising a destination identifier identifying a processing chip external to the memory attachment and routing chip and to route the second packet to a second port of the set of external ports, the second port being selected based on the destination identifier; and
a first computer device and a second computer device, the first computer device being connected to the first ports of the first memory attachment and routing chip and of the second memory attachment and routing chip via respective first and second links, the second computer device being connected to the second ports of the first memory attachment and routing chip and to the second memory attachment and routing chip via respective third and fourth links,
the first computer device comprising first processing circuitry configured to execute one or more computer programs and being connected to the first and second links to transmit and receive messages via the first and second links.

19. The computer of claim 18, wherein the second computer device comprises second processing circuitry configured to execute one or more computer programs and being connected to the third and fourth links to transmit and receive messages via the third and fourth links.

20. A method of routing packets in a computer system comprising a cluster of processor chips, the method comprising:
transmitting a packet from a designated external port of a first processor chip of the cluster of processor chips, the designated external port being connected to a memory attachment and routing chip of the cluster of processor chips, wherein the packet contains destination information;

at routing logic of the memory attachment and routing chip, determining from the destination information that the packet is destined for either: memory attached to the memory attachment and routing chip or a component attached to an external port of the memory attachment and routing chip; and routing the packet according to the destination information.

21. The method of claim 20, wherein the determining comprises determining from the destination information that the packet is destined for the memory attached and routing chip; and wherein the routing the packet comprises routing the packet to a memory controller of the memory attachment and routing chip.

22. The method of claim 20, wherein the determining comprises determining from the destination information that the packet is destined for the component attached to the external port; and wherein the routing the packet comprises routing the packet to the external port.

23. The method of claim 20, further comprising:

at the routing logic, receiving an additional packet which comprises a memory address in a first range of memory addresses outside a range associated with the memory attachment and routing chip;

determining a second memory attachment and routing chip associated with a second range of memory addresses; and routing the additional packet to the second memory attachment and routing chip via another external port.

* * * * *